April 9, 1929.  L. W. HOTTEL  1,708,178
PRESS FOR FORMING PLASTIC ARTICLES
Filed Jan. 17, 1928  2 Sheets-Sheet 1

Witnesses:—

Inventor
Louis W. Hottel,
By
Attorney

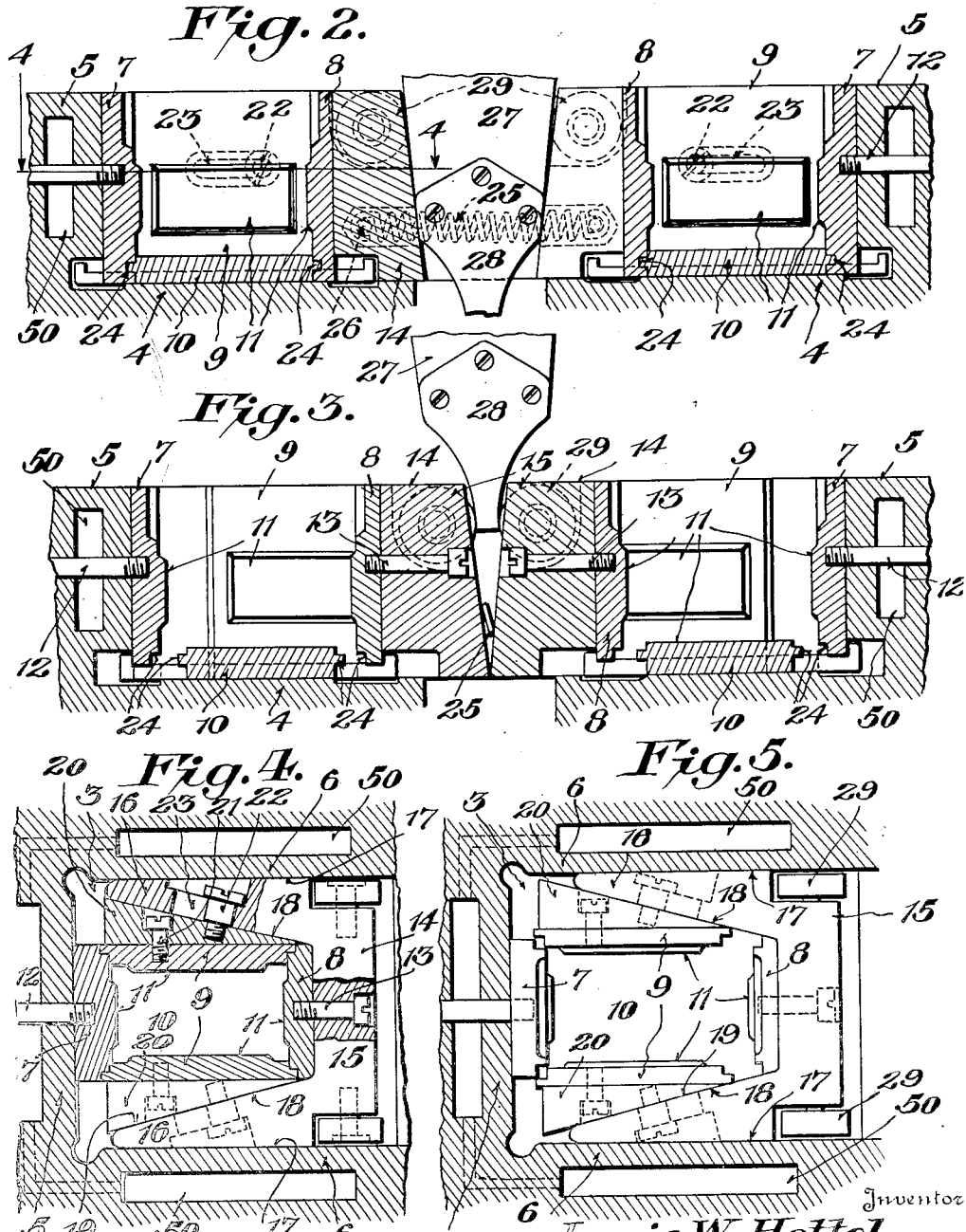

Patented Apr. 9, 1929.

1,708,178

UNITED STATES PATENT OFFICE.

LOUIS W. HOTTEL, OF DETROIT, MICHIGAN.

PRESS FOR FORMING PLASTIC ARTICLES.

Application filed January 17, 1928. Serial No. 247,424.

This invention relates to molding presses of that type possessing special utility as a press for fabricating hollow articles, particularly one-piece articles such as storage battery boxes and the like.

A principal object of the invention is to provide a molding press for hollow articles such as storage battery boxes of simple and practical construction, as well as simple and efficient in operation to rapidly and economically manufacture the hollow article with a minimum amount of attention required on the part of the press operatives. The invention also has in view a novel assemblage of press and mold elements that entirely dispense with mold stripping and kick-out devices of the character heretofore largely employed in machines of this general type. To that end the invention provides a novel mold construction, and a novel mold operating means, the latter entirely automatic in action, which in combination provide for the complete and instant formation of the box or other hollow article merely upon the insertion of the core element, under pressure, into the mold, and the complete automatic stripping of the mold from the article and the release of the article as the core element or elements are retracted. By reason of the utilization of these novel features in a mold press construction it is possible to operate a mold press of this character rapidly, with few working parts, thereby permitting large factory production of the article with a minimum overhead for operating the press.

A further and more general object of the invention is to provide a mold press so constructed as to be economical as to cost and operation, while at the same time obviating the many annoyances that are incident to the use of the ordinary high-pressure molding machines.

With these and other objects in view the invention consists in the novel construction, combination and arrangement of parts hereinafter more fully described, illustrated and claimed and while the essential features of the invention are necessarily susceptible of structural modification without departing from the spirit or scope thereof, a practical and preferable embodiment of the invention is shown in the accompanying drawings, in which:—

Figure 2 is a longitudinal sectional view of the bed plate part of the press showing the two molds, with the parts in the relative positions they occupy when the mold is closed, as when the cores are inserted therein.

Figure 3 is a view on the same line of section as Fig. 2 and including the same elements, but showing the parts in the relative positions they occupy when the mold automatically opens as the core elements and the die closing wedge are retracted or elevated.

Figure 4 is a horizontal sectional view of one of the molds in its closed condition, the line of section being indicated by the line 4—4 on Fig. 2.

Figure 5 is a view similar to Fig. 4 but showing a top plan view of the separable mold box within its boxing recess or cavity, and illustrating the die block retracted to open the mold.

Figure 1:
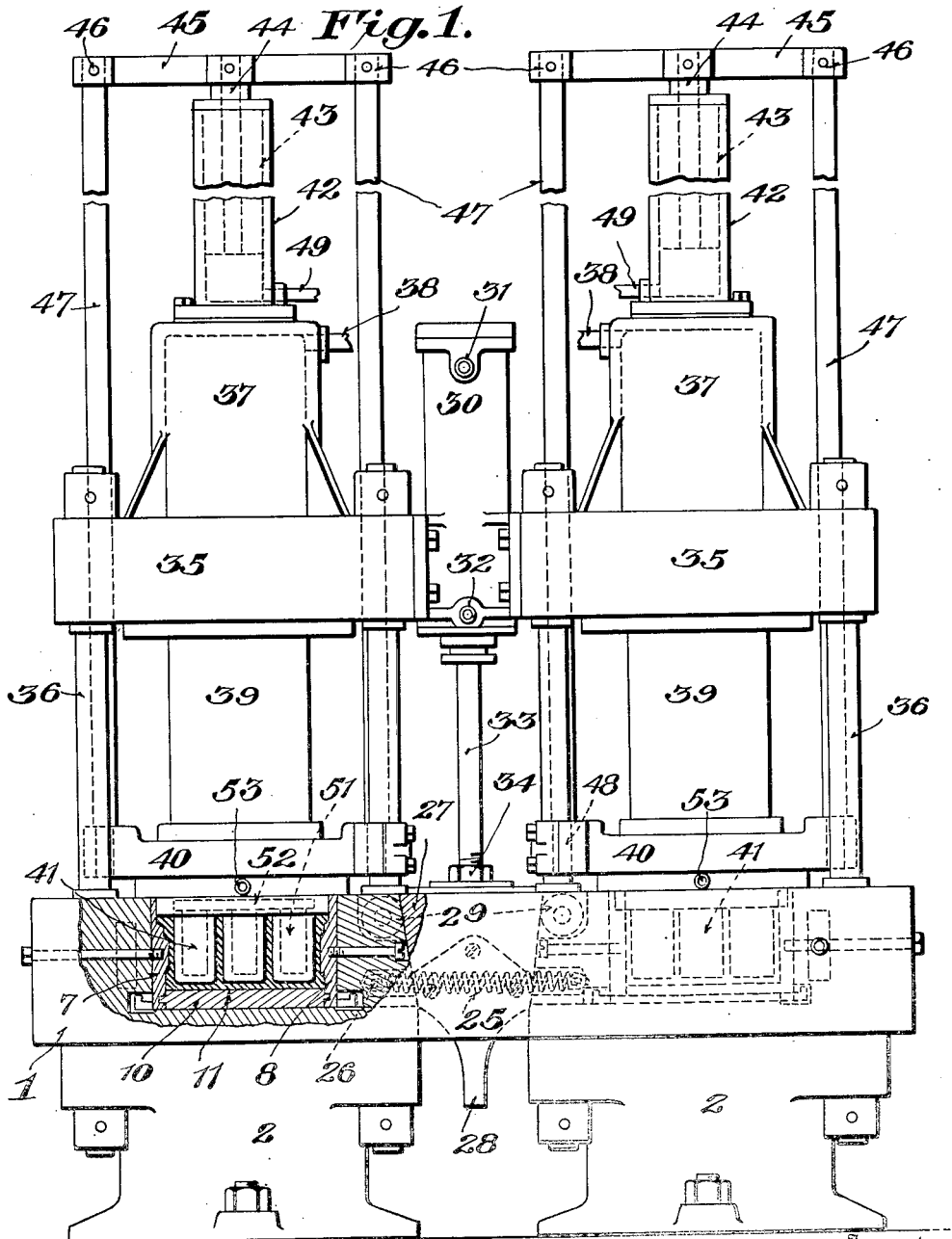
Figure 1 is a side elevation of a double or duplex molding press embodying the novel features of the present invention, a part of the structure being shown broken away to expose more clearly the relation of the mold or box and the core when the press is closed and the article is formed.

The present invention is particularly concerned with a novel mold construction and novel means for mechanically closing and opening the mold, particularly in connection with a double or duplex mold arrangement. Accordingly, in the preferred form of the invention as shown in the drawings, the same includes, primarily, a main horizontal bed plate 1. This bed plate usually consists of a single casting carrying a pair of molds, and may generally be termed the die box. Said bed plate is mounted and supported in any substantial or conventional manner as for instance by the pair of base strands 2—2 bolted or otherwise suitably secured to the floor upon which the press is mounted, and to which is bolted or otherwise suitably fastened said bed plate. As indicated the bed plate or die box 1 is preferably constructed so as to carry two fabricating molds which are operated in unison when it is desired to obtain a maximum quantity production, and to provide for the mounting of the molds, the upper side of the bed plate is recessed or channeled longitudinally thereof to provide within each end portion of the plate or die box a mold seat or recess 3 which is sufficiently deep to entirely house the various parts of the mold therein. This mold seat or recess 3 within each end portion of the bed plate 1, by reason of the channel formation of the bed plate forming the said seat or recess is provided with a solid bottom portion 4, with an outer solid end wall 5, and with opposite solid side walls 6, the side walls forming abutting slideways for a movable part of each mold as will hereinafter be more particularly referred to.

Within each mold recess 3 is assembled the various elements of a separable fabricating mold which includes in its general organization the opposite end plates 7 and 8 respectively, the opposite side plates 9—9 and the bottom plate 10, all of which plates when in assembled matching relation as clearly shown in Figs. 4 and 5 of the drawings, constitute a complete mold within and by which is formed the battery box or other hollow articles. In that connection it will be noted that the inside faces of the mold plates 7, 8, 9 and 10 are formed with panels or intaglio portions 11 which have the shape or configuration which it is desired to give to the outside wall surfaces of the box or hollow article. A distinctive feature of the invention, with reference to the individual fabricating mold construction and assemblage is that each mold has the end wall 7 thereof rigidly fixed or fastened to the outer solid end wall 5 of the mold recess, by means of a fastening bolt or screw 12 or other equivalent fastening means thereby making the end plate 7 the fixed end plate of the mold. The directly opposite end plate 8 of each mold is rigidly or otherwise suitably fastened as by means of a fastening screw or other device 13 to the transverse member 14 of a forked movable die block 15, which includes in its forked formation the opposite wedging fingers 16 projecting from one side of the said transverse member 14 of the die block. The said wedging fingers 16 of the movable die block 15 are provided with straight outer bearing faces 17 having a guided and sliding engagement with the opposite solid slide wall 6 of the mold recess, and the inside or inner faces 18 of the said fingers 16 are inclined to provide wedging surfaces which slidably engage the inclined wedging surfaces 19 of the wedge blocks 20 to which wedge blocks are rigidly fastened by means of the fastening screws or equivalent elements 21 the side plates 9 of the fabricating mold. Furthermore, the said wedge blocks 20 which carry the side plates 9 of the fabricating mold have secured thereto the interlock studs or equivalent elements 22 which slidably interlock with or engage the wedging fingers 16 through the slots 23 in said wedging fingers. To complete the detail formation of the individual fabricating molds it is preferable that the interengaging edges of the mold plates 7, 8, 9 and 10 shall be of a mating, rabbeted and recessed formation, as indicated by the reference number 24.

In adapting the improved fabricating mold construction and assemblage to a double or duplex press, it will be observed that the space between the opposite mold recesses 3 is open throughout to accommodate the mounting and movement of the die blocks 15 of the opposite molds, and in such arrangement it is preferable to employ retractile mold-opening springs 25 interposed between the two opposite and adjacent die blocks 15 and fastened at their ends thereto by fastening pins or otherwise, as indicated at 26. These springs are of sufficient strength and tension to provide for normally and automatically drawing the die blocks 15 inwardly and away from the mold plates 7 and 9 thereby opening up the molds.

To provide for closing the molds, and locking the mold assemblage tightly and rigidly during the formation of the box or other hollow article the main mold closing wedge 27 is employed, which wedge 27 is provided with a hardened double tapered pilot cam 28 which is designed to operate between the opposite die blocks 15 of the opposite molds and to engage the hardened bearing rollers 29 mounted on spindles fitted to and carried by the die blocks 15 at opposite corners of the latter as more plainly shown in Figs. 4 and 5 of the drawings.

It is preferable in carrying out the invention to operate the mold closing wedge 27 by power and for that purpose a power cylinder 30 is employed, of the double acting type having the fluid control connections 31 and 32 respectively at the opposite ends thereof, and including the piston operated stem for piston rod 33 having a rigid connection as at 34 with with the upper side of the mold closing wedge 27. The power device 30 for operating the mold closing wedge may conveniently be mounted on an upper supporting beam 35 which is held in position above the bed plate 1 by the supporting standards 36 and upon the supporting beam is also mounted the ram cylinders 37, preferably having the two-way pressure fluid connections 38 so that the ram cylinders 37 will be single acting, that is the ram or piston member 39 of each ram cylinder 37 will be operated under pressure in one direction only and on the return movement thereof the pressure fluid is drained or released through the connection 38. The said ram or piston member 39 of each ram preferably carries a platen or head 40 to which is secured the core 41 of a shape and dimension to accurately fit within and form a complemental part of the mold to provide for forcibly shaping the hollow box or other article when the said core is forcibly lowered into the mold.

To provide for lifting each core there is preferably provided a supplemental power lifting device in connection with each ram, the said lifting device comprising a power cylinder 42 having a piston 43 therein connected by a piston rod 44 with the yoke 45 to the opposite ends of which yoke as at 46 are connected the draw-back rods 47, which draw-back rods are suitably connected at their lower ends as at 48 to the platen or head 40 which carries the core. The power cylinder 42 has a single pressure fluid connection 49 therewith through which the pressure fluid is introduced to elevate the piston therein, and through which the pressure fluid is released or drained off when the piston 43 lowers at the time pressure is introduced into the ram cylinder 37 to lower the core into the mold.

To insure a successful carrying out of the operation, on the press described, of forming a battery box from insulating plastic material provision is made for circulating water or other fluid about the molds and also within the cores. For that purpose the bed plate 1 is provided about each mold recess with suitable fluid circulating chambers 50 in communication with each other and with an outside source of water or other fluid supply and each core 41 is likewise cored with fluid circulating chambers 51 in communication with a supply chamber 52 and with an outside source of fluid supply through a connection 53. The purpose of the fluid circulating chambers about the mold and within the core is to permit the use of hot and cold water as may be required or desired and as will be more particularly referred to.

From the foregoing description the mechanical functioning of the press will now be clear and readily understood. With the mold closing wedge 27 elevated the springs 25 hold the opposite die blocks 15 in a retracted position and therefore hold both molds open, with the parts in their relative position indicated in Figs. 3 and 5 of the drawings. The mass of plastic material is then placed within each mold upon the bottom plate thereof, the requisite quantity being used to make a complete box or other hollow article therefrom and after placing the plastic material into position the power fluid is introduced into the power cylinder 30 to provide for lowering the mold closing wedge with the result of carrying said wedge downward against the rollers 29 and between the opposite die blocks 15, the said die blocks in turn moving outwardly toward the fixed end plates 7 of the molds and bringing the mold plates 7, 8, 9 and 10 into rigid interlocked relation, as shown in Figs. 2 and 4 of the drawings whereupon the descending cores 41, carrried by the ram or piston members 39 enter the molds and forcibly squeeze the mass of plastic material into box form throughout the entire mold space, the interval between the core and the various plates or walls of the mold.

It is preferable to introduce the mass of plastic material into the molds while such material is hot, and the cores in their upper positions will preferably have hot water circulated through them in order to keep the same at a fairly high temperature so that they can more easily be forced into the material, and especially if the material should be slightly cold or stiff the warm cores will facilitate the forming operation. At the time the mold assumes its closed condition, the hot water will be cut off by any suitable arrangement and cold water immediately started through the cores. This serves a two-fold purpose. First, the purpose mentioned above, namely, to render the material more easily formed, and second because the material when hot expands and the metal in the core likewise when hot expands so consequently when the core is chilled and the metal contracts the material likewise will shrink, which naturally permits the core to be more easily pulled or withdrawn from the formed article. In connection with the fluid circulating spaces about the mold recesses warm water is preferably circulated through such chambers or spaces in order to keep the mold plate sufficiently warm to give a finish on the material.

When the article is completely formed as described the power cylinders 42 are operated to lift the cores out of the formed article and the power device 30 is reversed in operation to lift the main operating wedge, thereby to permit the mold-opening springs 25 to draw back the die blocks 15 with the mold plates 8 and 9. The operation described is then repeated.

The terms side and end plates employed herein in describing the mold are merely relative terms applied to the example of the invention shown and not intended to limit the invention to the use of such plates as end plates and side plates, or vice versa.

From the foregoing it is thought that the construction and operation and many advantages of the herein described molding press will be now apparent without further description, and it will also be understood that changes in the form, proportion and minor details of construction may be resorted to without departing from the spirit or sacrificing any of the advantages of the invention. Also, the press construction described herein is susceptible of efficient operation in a reversed position from that shown in the drawings without departing from the intent and scope of the invention.

I claim:—

1. A molding press of the class described, including the machine bed having a mold recess, a separable mold seated in the recess and comprising a bottom plate, a sliding die block carrying three of the mold walls, and a relatively fixed mold wall, and means for actuating said die block in two directions.

2. A molding press of the class described including the machine bed having a mold recess, a separable mold seated in the recess and comprising a bottom plate and a plurality of separable interlocking wall plates registering with each other and with the bottom plate and one of which wall plates is relatively fixed, and a movable member carrying the various wall plates other than the relatively fixed plate and means for actuating said movable member to open and close the mold.

3. A molding press of the class described including the machine bed having a mold recess, a separable mold seated in the recess and comprising a sliding die block carrying three of the mold walls, and a relatively fixed mold wall, and means for actuating said die block in two directions.

4. A molding press of the class described including a machine bed, a separable mold mounted on the machine bed and comprising a relatively fixed mold wall, a sliding die block, a mold wall rigid with the die block, a pair of opposite mold walls carried by the die block and having a movement relative thereto, and means for actuating the die block in two directions respectively to close and to open the mold.

5. A molding press of the class described including a machine bed, a separable mold comprising a fixed end wall, a sliding die block carrying the other end wall, a pair of opposite mold side walls carried with the sliding block and having a separate relative movement, and means for actuating the die block in two directions.

6. A molding press of the class described including a machine bed, a separable mold mounted on the machine bed comprising a fixed end wall, a sliding die block having wedging elements, an end wall fixed to the die block, a pair of opposite mold side walls carrying wedge blocks cooperating with said wedge elements and slidably interlocked with the die block, and means for actuating the die block in two directions.

7. A molding machine of the class described including a machine bed having a mold recess, a separable mold seated in said recess and comprising a bottom plate on the floor of the recess, a fixed end wall secured to a wall of the recess, a forked die block having wedging fingers slidably engaging the sides of the mold recess, an end plate fixed to the die block, opposite mold side plates carrying wedge blocks slidably engaging the wedging fingers of the die block and having a slidable interlocking connection with said fingers and means for actuating the die block automatically, in both directions.

8. A molding machine of the class described including a machine bed, a pair of separable molds seated on the machine bed and each including a movable die block carrying a plurality of the mold walls, means for retracting the opposite die blocks of the separate molds, and a power actuated mold closing device operated between the opposite die blocks.

9. A molding machine of the class described including the machine bed, power actuated mold cores, a pair of separable molds mounted on the machine bed and each including a movable die block carrying a plurality of the mold walls, a common retracting device for the two die blocks causing them automatically to open the molds and a power actuated mold closing wedge operating under pressure to enter both die blocks to cause a closing of both molds.

10. A machine of the class described including a pair of oppositely arranged separable molds each having a movable block carrying a plurality of mold walls, power means for introducing mold cores into the molds and for retracting the cores, means for automatically moving both die blocks in a direction to open both molds, and a common means for actuating both die blocks in a direction to close both molds.

In testimony whereof I hereunto affix my signature.

LOUIS W. HOTTEL.